United States Patent Office 3,104,081
Patented Sept. 17, 1963

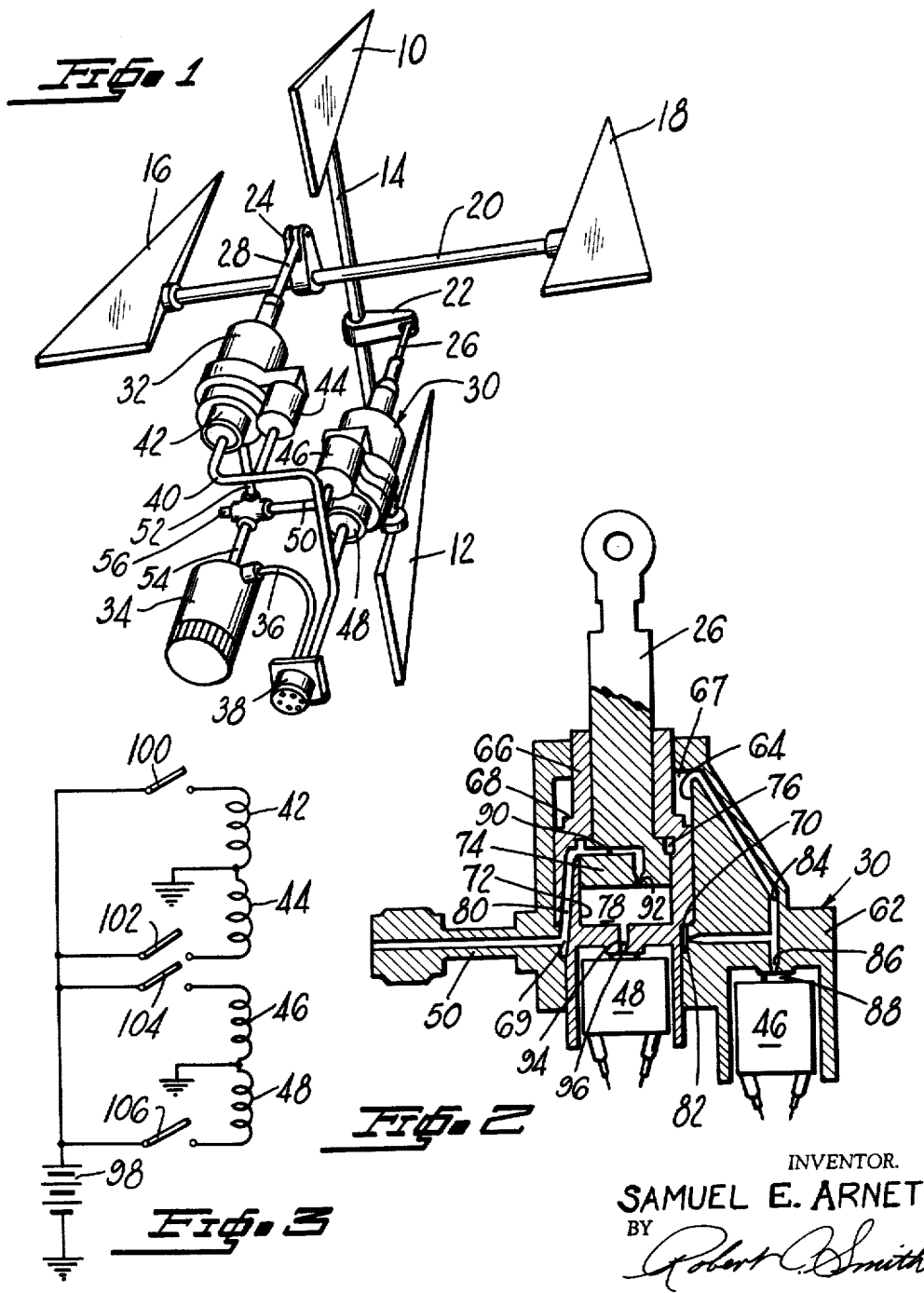

3,104,081
SOLENOID OPERATED THREE-POSITION
PNEUMATIC ACTUATOR
Samuel E. Arnett, South Bend, Ind., assignor to The
Bendix Corporation, a corporation of Delaware
Filed Nov. 27, 1959, Ser. No. 855,670
7 Claims. (Cl. 244—14)

This invention relates to fluid controlled actuating devices and more particularly to a pneumatically operated actuator suitable for moving control surfaces on a missile.

Certain types of missiles presently available and under development are designed for a comparatively short operational life and for volume production within reasonable costs. Attitude controls for such missiles need not always be very sophisticated but they should be reliable and inexpensive to produce. One of the ways in which such controls may be simplified is to make the control surfaces or fins actuatable in only a limited number of positions rather than infinitely variable. It is therefore an object of the present invention to provide a control surface actuator for a missile in which the output shaft is positively located and is held in a finite number of positions.

It is another object of the present invention to provide an actuator accomplishing the above object and which obtains the desired speed of actuation from gaseous products of combustion, particularly of a solid propellant.

It is another object of the present invention to provide an actuator which accomplishes the above objects while requiring a low mass flow rate thus permitting the servo actuators to act as heat sinks.

It is a further object of the present invention to provide an actuator which accomplishes the above objects and which is simple, reliable and inexpensive to produce and which can be fabricated without resorting to the use of expensive high temperature resistant materials.

Other objects and advantages will become apparent from the following specification and the accompanying drawings in which:

FIGURE 1 is a perspective view of my actuation system as it would be installed to operate the control surfaces or fins of a missile;

FIGURE 2 is a sectional drawing of one of the actuators of FIGURE 1; and

FIGURE 3 is a schematic drawing of a possible switching circuit for controlling the actuators shown in FIGURES 1 and 2.

Referring now to FIGURE 1, the primary purpose of the actuation system is to control the operation of a pair of vertical control surfaces or fins 10 and 12 which are attached to the ends of a shaft 14 and a pair of horizontal control surfaces or fins 16 and 18 which are attached to a shaft 20. The shafts 14 and 20 have attached thereto bifurcated arms 22 and 24, respectively and which are moved to a finite number of positions by means of control shafts 26 and 28. The axial position of shaft 26 and, hence, the attitude of control surfaces 10 and 12 is controlled by means of an actuator 30. Similarly, the control shaft 28 and the attitude of the horizontal control members 16 and 18 is controlled by means of an actuator 32. The energy for moving the respective control surfaces is provided by means of a power unit 34 consisting of a container containing a supply of solid propellant fuel. The solid propellant is ignited by means of an igniter which is embedded in the propellant and which receives an electrical impulse through the wire 36 which is connected to an electrical connector 38. Also connected to electrical connector 38 by means of wires positioned within a conduit 40 are a pair of solenoids 42 and 44 forming part of actuator 32 and a pair of solenoids 46 and 48 forming part of actuator 30. The gaseous products of combustion of the solid propellant are supplied to the actuators 30 and 32 through conduits 50 and 52 which are connected to a common pipe 54. A cold gas check out port 56 is provided at the common junction of these conduits. These control surfaces are located, as shown, in planes perpendicular to each other and it will be assumed for purposes of the present description that the surfaces 16 and 18 are used to control pitch of the missile and control surfaces 10 and 12 are used to control yaw of the missile.

FIGURE 2 shows a sectional view of the actuator 30 which operates to control the effective axial position of the control shaft 26. Actuator 30 includes a housing 62 containing a cylinder 64 which receives a piston 66 movable axially therein thus dividing said cylinder into chambers 67 and 69. Piston 66 is so designed that it has a first end 68 having an effective area larger than the effective area of its opposite end 70. Located within the hollow interior of piston 66 is a second cylinder 72 containing a second piston 74 which, as shown, forms part of the actuating shaft 26. Piston 74 divides cylinder 72 into a first chamber 76 and a second chamber 78. The dimensions of piston 74 are such that the fluid pressure in chamber 76 acts on an appreciably smaller area of said piston than does that acting in chamber 78. The gaseous products of combustion of the solid propellant in container 34 are supplied through the conduit 50 to the chamber 69 against the small area side of piston 66 and also through a conduit 80 to the chamber 76 against the small area side of piston 74. From chamber 69 the working fluid flows through a restriction 82 to a conduit 84 which communicates with chamber 67 on the large area side of piston 66 and also to a restricted orifice 86 which communicates with the atmosphere or other low pressure source and which is controlled by means of the solenoid 46 and its associated valve member 88. From chamber 76, the working fluid also flows through a conduit 90 having a restriction 92 into the chamber 78. A restricted conduit 94 provides communication between chamber 78 and the atmosphere or other low pressure source and this restriction is controlled by means of the solenoid 48 and its cooperating valve member 96.

In the device shown in FIGURE 2, the two actuating pistons each have a large area and a small area end and, with the solenoid valve members 88 and 96 in the position shown, i.e., closing their respective orifices, the high pressure gas flowing in conduit 50 will flow into chamber 69 where it will exert a pressure on the small area side of piston 66, across the restriction 82, into passage 84, and into chamber 67 where it will exert substantially the same fluid pressure level against the larger area end of piston 66. This will, of course, cause piston 66 to be moved to the end of its travel in the downward direction as shown. At the same time, this fluid pressure is exerted through conduits 80 and 90, restriction 92, and into chamber 78. Inasmuch as the effective area acting against the piston 74 from chamber 78 is much greater than that from chamber 76, the piston 74 is moved to its limit of travel in the upward direction as shown. Under these conditions, the shaft 26 is positioned in the intermediate of its three actuated positions. Assume now that solenoid 46 is energized and valve member 88 is pulled away from the restricted orifice 86, thereby permitting the high pressure fluid to flow out of chamber 67 through conduit 84 to the atmosphere, while at the same time, due to the action of restriction 82, a substantial gas pressure still acts in chamber 69 against the smaller area side of piston 66. This will cause piston 66 to be moved to the limit of its travel in an upward direction thereby carrying with it piston 74 and shaft 26 and also solenoid 48. The shaft 26 would then reach its maximum limit of travel in the upward direction, as shown. Should solenoid 48 be energized rather than solenoid 46, the valve member 96 will permit the high pressure gas to flow out of chamber 78 through the restriction 94 thereby substantially reducing the pressure acting against the bottom side of the piston 74, while at the same time, the gas pressure remains at a substantial level in the chamber 76. Under these conditions, the piston 74 will be moved to the bottom of the cylinder 72 and the actuating shaft 26 will be held in the lowest of its three possible positions as shown. From the foregoing, it will be seen that actuator shaft 26 has three effective positively located positions depending upon whether one or the other or neither of the solenoids is actuated. When there is no signal supplied to either of the solenoids, the actuated shaft 26 remains in the intermediate of its positions which would normally keep the control surfaces 10 and 12 in the straight-ahead position shown in FIGURE 1. Should it be desired to actuate the control surfaces in one direction, the solenoid 46 can be energized thereby dumping the pressure existing in chamber 67 out of the restricted orifice 86 and causing the piston 66 to be moved to its upward limit of travel and thereby causing the shaft 26 to reach its upward limit of travel. When the opposite solenoid is energized, the pressure is released from chamber 78 and the piston 74 reaches its bottom limit of travel with piston 66 remaining in the position shown thereby causing the shaft 26 to be in its lowest position.

FIGURE 3 shows a circuit in which means are provided for energizing the various solenoids shown in the system of FIGURE 1. A source of electrical energy which for convenience has been shown as a battery 98 is connected between ground and each of a plurality of switches 100, 102, 104 and 106 which are effectively positioned between the battery and the windings of solenoids 42, 44, 46 and 48, respectively. With reference to FIGURES 1 and 2, energizing of solenoid 48 would cause the pressure to be reduced in chamber 78, thus causing the actuating shaft 26 to reach the lowest of its positions as shown in FIGURE 2, and, as shown in FIGURE 1 would cause the lever arm 22 and shaft 14 to be rotated clockwise as viewed from above. If switch 104 is actuated rather than switch 106, the shaft 26 is moved in the opposite direction causing the lever arm 22 and the shaft 14 to be rotated in a counterclockwise direction as viewed from above. Similarly when solenoid 42 is energized by closing switch 100, the shaft 28 is moved into the housing of actuator 32 and lever arm 24 and shaft 20 are rotated counterclockwise, as viewed from the right side. Closing of switch 102 and energizing of solenoid 44 will cause the opposite movement of these members. From the foregoing, it is apparent that the system shown herein is not capable of making very fine adjustments in the angle of the control surfaces but must rely on simply changing direction as required to reach a desired destination. It is possible, however, for the system to provide a change in direction of the associated missile in a plane located at 45° from the horizontal or vertical as previously described. For instance, should solenoid 42 and solenoid 48 be both energized at the same time, the shaft 20 will be rotated counterclockwise and the shaft 14 will be rotated clockwise as viewed from above, thus causing the associated missile to move in an angular direction toward the right and up, assuming that the control surfaces are located near the front of a missile having its forward end in the direction indicated by the pointed ends of the control surfaces. It will be appreciated that although the solenoid actuating means is shown as a plurality of simple switches, a guidance system could very well energize one or more of these solenoid members simultaneously as desired.

Although only one embodiment is shown and described herein, modifications may be made to suit the requirements of particular applications without departing from the scope of the present invention.

I claim:

1. An actuation system for a missile comprising a control shaft, a first pair of control surfaces attached to said control shaft, a second control shaft position normal to said first shaft, a second pair of control surfaces attached to said second control shaft, a source of gas under pressure, actuators for rotating each of said shafts including a housing, a cylinder in said housing, a first piston movable in said cylinder, a first conduit connected to said source and to said cylinder adjacent one end of said piston, a second conduit connected to said cylinder adjacent one end of said piston and to said cylinder adjacent the opposite end of said piston which opposite end has a larger effective area than said one end, a restriction in said second conduit, a first port connecting said second conduit downstream of said restriction with a low pressure source and a first solenoid controlling the flow through said port, a second cylinder located within said piston and a second piston movable in said cylinder and an actuating shaft connected thereto and to said control shaft, a third conduit connected to said source and communicating with said second cylinder adjacent one end of said second piston, a fourth conduit providing communication between said one end and the other end of said second piston said other end having the larger effective area, a restriction in said fourth conduit, a second port connecting said second cylinder adjacent the opposite end of said second piston and a low pressure source, and a second solenoid carried by said first piston controlling the flow through said second port.

2. An actuation system as set forth in claim 1 including switching means for energizing more than one solenoid in separate actuators simultaneously thereby causing said missile to be deflected in a direction at an angle to that which is would assume if only one solenoid were energized.

3. An actuation system for a missile comprising a control shaft, a control surface connected to said control shaft, a source of gas under pressure, an actuator for moving said shaft including a housing, a cylinder in said housing, a first piston movable in said cylinder, a first conduit connected to said source and to said cylinder adjacent one end of said piston, a second conduit connected to said cylinder adjacent one end of said piston and to said cylinder adjacent the opposite end of said piston which opposite end has a larger effective area than said one end, a restriction in said second conduit, a first port connecting said second conduit downstream of said restriction with a low pressure source and a first solenoid controlling the flow through said port, a second cylinder located within said piston and a second piston movable in said cylinder and an actuating shaft connected thereto and to said control shaft, a third conduit connected to said source and communicating with said second cylinder adjacent one end of said second piston, a fourth conduit providing communication between said one end and the other end of said second piston said other end having the larger effective area, a restriction in said fourth conduit, a second port connecting said second cylinder adjacent the opposite end of said second piston and a low pressure source, and a second solenoid carried by said first piston controlling the flow through said second port.

4. An actuation system for a missile comprising a control shaft, a control surface connected to said control shaft, a source of gas having high kinetic energy, an actuator for moving said control shaft including a housing, a cylinder in said housing, a piston movable in said cylinder having one end of larger effective area than the other, a second cylinder in said piston and a second piston in said second cylinder having one end of larger effective area than the other, one of said pistons being connections between said source and the ends of said pistons having the lower effective area, restricted conduits providing communications between said ends and the opposite ends of said pistons, said conduits and said pistons being arranged such that the pressure acting against the ends having the greater effective area will tend to cause said pistons to be moved in opposite directions, restricted passages connecting the ends of said pistons having the greater effective area with a low pressure source, and electro-responsive means for controlling the flow through said passages.

5. A pneumatic actuator adapted to positively locate a control shaft in one of three positions comprising a housing, a source of gas under pressure connected to said housing, a cylinder in said housing, a piston movable in said cylinder having one end of larger effective area than the other, a second cylinder in said piston and a second piston in said second cylinder having one end of larger effective area than the other, one of said pistons being connected to said shaft, conduits providing communication between said source and the ends of said pistons having the lower effective area, restricted conduits providing communication between said ends and the opposite ends of said pistons, said conduits and said pistons being arranged such that the pressure acting against the ends having the greater effective area will tend to cause said pistons to be moved in opposite directions, restricted passages connecting the ends of said pistons having the greater effective area with a low pressure source, and electro-responsive means for controlling the flow through said passages.

6. A pneumatic actuator adapted to positively locate a control shaft in one of three positions comprising a housing, a source of gas under pressure and connections between said source and said housing, a cylinder in said housing and a piston movable in said cylinder having ends of unequal effective area, a second cylinder concentrically positioned within the interior of said piston and a second piston having ends of unequal effective area movable in said second cylinder, said control shaft being connected to one of said pistons, conduits providing communication between said source and the ends of said pistons having the lower effective area, restricted conduits providing communication between said ends and the opposite ends of said pistons, restricted passages connecting the ends of said pistons having the greater effective area with a low pressure source, and first and second electro-responsive means for controlling the flow through said passages, said second electro-responsive means being carried by said first piston, said conduits, passages and pistons being so arranged that when the flow through said passages is blocked, the gas pressure is effective against the ends of said pistons having the greater effective area and said shaft is caused to assume an intermediate position, when flow through one of said passages is permitted, one of said pistons is moved to the opposite end of its travel by gas pressure acting against its end having the smaller effective area, and said shaft is caused to be moved to the end of its travel in a first direction, and when flow through the other of said passages is permitted, the other piston is moved to the other end of its travel by gas pressure acting against its end having the smaller effective area, and said shaft is caused to be moved to the end of its travel in a second direction.

7. A pneumatic actuator adapted to positively locate a control shaft in one of three positions comprising a housing, a source of gas under pressure and connections between said source and said housing, a cylinder in said housing and a piston movable in said cylinder having ends of unequal area, a second cylinder concentrically positioned within the interior of said piston and a second piston having ends of unequal effective area movable in said second cylinder, said control shaft being connected to one of said pistons, conduits providing communication between said source and the ends of said pistons having the lower effective area, restricted conduits providing communication between said ends and the opposite ends of said pistons, restricted passages connecting the ends of said pistons having the greater effective area with a low pressure source, and first and second electro-responsive means for controlling the flow through said passages, said second electro-responsive means being carried by said first piston, whereby energizing of said first electro-responsive means causes said first piston to be actuated thereby carrying said shaft to the most extended of its three positions, energization of said second electro-responsive means causes said second piston to be actuated thereby carrying said shaft to its most contracted position, and when neither of said electro-responsive means are energized, said shaft is maintained in an intermediate position.

References Cited in the file of this patent

UNITED STATES PATENTS 2,510,314  Jirsa ------------------ June 6, 1950

FOREIGN PATENTS 1,012,523  France ---------------- Apr. 16, 1952

UNITED STATES PATENT OFFICE
CERTIFICATE OF CORRECTION

Patent No. 3,104,081                      September 17, 1963

Samuel E. Arnett

It is hereby certified that error appears in the above numbered patent requiring correction and that the said Letters Patent should read as corrected below.

Column 4, line 74, strike out "tions" and insert instead -- nected to said shaft, conduits providing communication --; column 5, line 1, for "communications" read -- communication --.

Signed and sealed this 28th day of April 1964.

(SEAL)
Attest:

ERNEST W. SWIDER
Attesting Officer

EDWARD J. BRENNER
Commissioner of Patents